June 8, 1943. C. J. KAMIN 2,321,391
CLAMP
Filed March 19, 1942
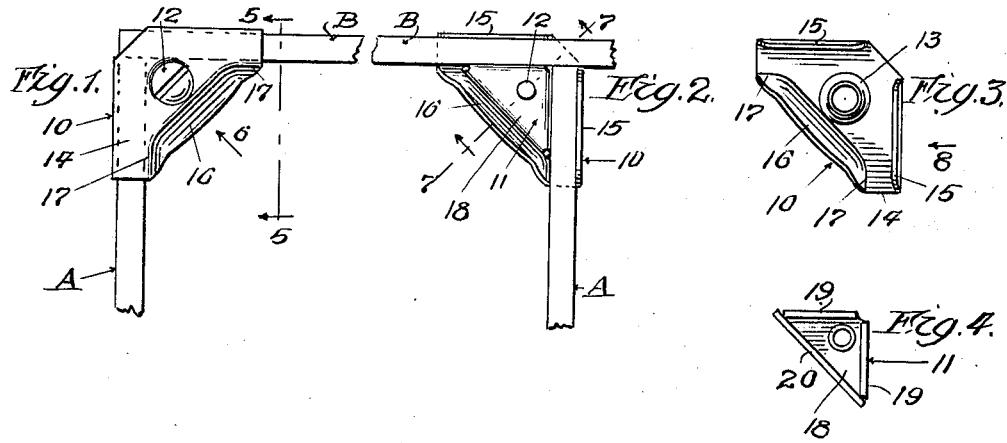
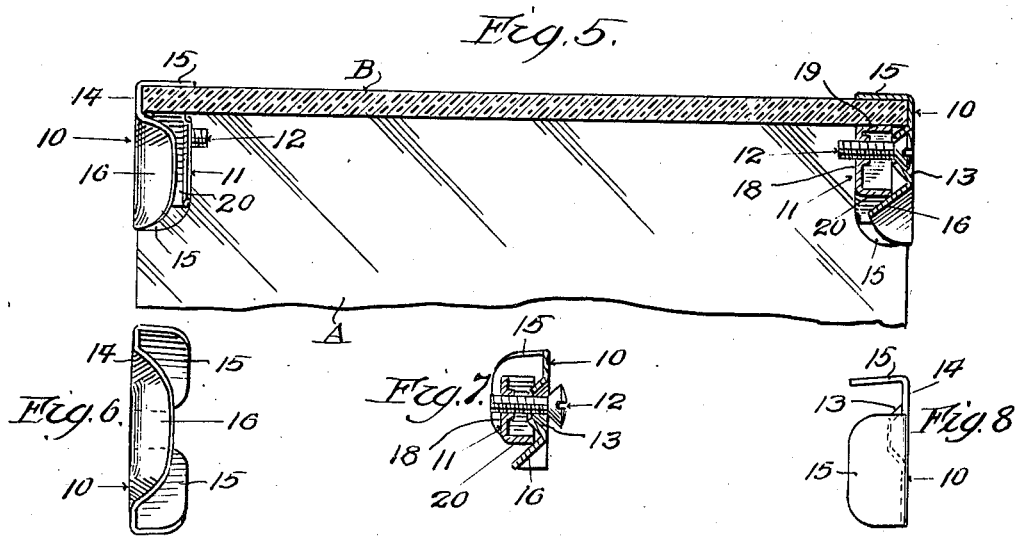
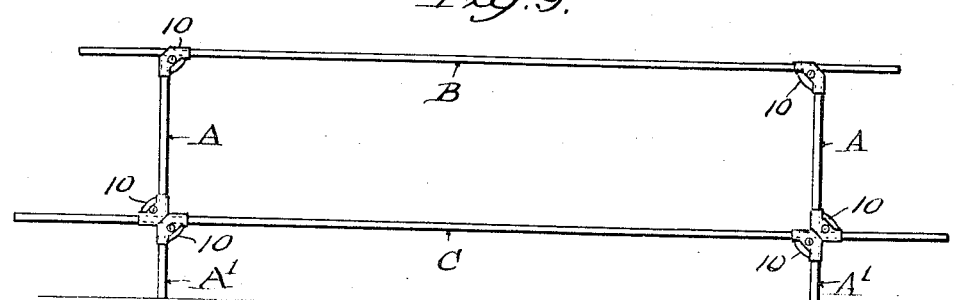
Inventor;
Clifford J. Kamin Patented June 8, 1943

2,321,391

UNITED STATES PATENT OFFICE 2,321,391

CLAMP

Clifford J. Kamin, Chicago, Ill., assignor to Reflector Hardware Corporation, Chicago, Ill., a corporation of Illinois Application March 19, 1942, Serial No. 435,289

4 Claims. (Cl. 24—81)

This invention relates to clamps adapted for joining panels, such as glass or other flat plates of any material, in angular relation to each other, whereby to form shelving, over counter risers, show cases, bins and the like.

One of the objects of this invention is to simplify clamps of this character; and to eliminate long bolts usually employed in connection with such clamps.

Another object is to provide a single type of clamp which may be used to provide corner connections between angularly disposed panels; to provide T's between them and to join them at places where their planes intersect.

Other objects and advantages will appear in the course of this specification, and with all of said objects and advantages in view, this invention consists in the several novel features of construction, arrangement and combination of parts hereinafter fully set forth and claimed.

The invention is clearly illustrated in the drawing accompanying this specification, in which:

Fig. 1 is a side elevation of a clamp embodying a simple form of the present invention, showing the same applied to an upright and a horizontal panel forming a corner of shelving or the like;

Fig. 2 is a rear side elevation of said clamp, showing it applied to an upright and a horizontal panel forming a T joint;

Fig. 3 is a rear side elevation of the clamp plate member of the clamp;

Fig. 4 is a side elevation of the clamp block member thereof;

Fig. 5 is a vertical cross section taken on the line 5—5 of Fig. 1 with a clamp at the right of the figure shown in vertical section taken through the screw thereof;

Fig. 6 is an edge view of the clamp plate looking in the direction of the arrow 6 in Fig. 1;

Fig. 7 is a cross section taken on the line 7—7 of Fig. 2 of the clamp disconnected from the panels;

Fig. 8 is an edge view of the clamp plate looking in the direction of the arrow 8 in Fig. 3; and Fig. 9 is a side elevation of shelving made up of panels and several of the clamps forming the subject matter of this specification.

Referring to said drawing which is merely illustrative of one embodiment of the invention used for joining upright and horizontal panels to provide shelving, over counter risers, show cases, bins and the like, the reference characters A, A[1] (see Fig. 9) designate upright panels of a shelving, and the reference characters B, C, designate horizontal panels thereof which are joined to the upright panels by clamps forming the subject matter of this invention. The panels are usually composed of glass plates, but they may be made of other suitable materials.

The clamp in its simplest form comprises a clamp plate 10, and a clamp block 11, connected thereto by a screw 12 which serves to tighten the clamp block against the panels. The screw has its head seated in a counter-sink 13 formed in the clamp plate 10 and as shown is threadedly engaged in the clamp block. The clamp plate 10 is formed of resilient sheet metal and comprises a side member 14 of truncated right angle triangular form with the metal at the right angle corner cut away at an angle of approximately forty-five degrees. The side member of the clamp plate is adapted to contact with the side edges of the panels to be joined.

Rearwardly extending flanges 15 are bent back from the right angled sides of the side member for engagement with faces of the panels to be joined. The flanges 15 are bent to stand at a slight angle to the side member (see Fig. 8) to provide for resilient engagement with the faces of the panels when the clamp is clamped thereon, as will be presently explained.

The side member 14 is formed with a third rearwardly extending flange 16, which extends obliquely to the right angled flanges 15 and at an angle of approximately forty-five degrees thereto, and said diagonal flange slopes from the side member, as seen in Figs. 5 and 7, to provide an inclined plane which cooperates with the clamp block to clamp the clamp upon the panels. The ends of the oblique flange merge into the plane of the side member 14, as at 17.

Desirably the clamp block is composed of sheet metal of slightly heavier gauge than the clamp plate and is of right angle triangular form. Right angled flanges 19 are bent up from the right angled sides of its body 18, and an oblique flange 20 is bent up from its oblique side and desirably overlaps the adjacent ends of the flanges 19 (see Fig. 4). This arrangement provides rigid abutments for the oblique flange 20 to bear against, thereby preventing it from being distorted when being forced along the inclined plane of the oblique flange of the clamp plate.

The right angled flanges of the clamp block are adapted to extend parallel with the right angled flanges of the clamp plate and provide panel receiving grooves therebetween, and the oblique flange of the clamp block extends parallel with the oblique flange of the clamp plate and is adapted to ride thereon when the screw is being tightened up, whereby the clamp block is forced in an oblique direction toward both right angled flanges 15 of the clamp plate. The diameter of the hole in the counter-sink of the clamp plate is made slightly greater than the diameter of the screw to permit the aforementioned lateral movement of the clamp block.

In joining two panels to provide an angle or a T connection, the panels are placed at right angles to each other with an end edge of one abutting against a face of the other, and the clamp is placed upon the edge portions of the panels at the joint with the right angled flanges and clamp block straddling the edge portion. The screw is then screwed up tight, thereby causing the clamp block to ride upon the inclined plane of the oblique flange of the clamp plate, whereby the clamp block is forced in the direction of the two panels, causing the panels to be tightly gripped between the right angled flanges of the clamp plate and the clamp block. A similar clamp block is attached to the two panels on the opposite side edges thereof in the same manner. Similarly, other panels are connected to one or both of said first mentioned panels to construct shelving, an over counter riser, bin or the like. It will be observed that the right angled flanges of the clamp plate yield slightly under the clamping action of the clamp block until they lie flush with the face of the panel with which they engage. It will be seen, therefore, that said flanges continually maintain a spring pressure against the panels which is opposed by the pressure of the clamp block against the other sides of the panels.

In joining panels whose planes intersect, the end edges of two aligned panels are placed against the opposite faces of a third panel, and two clamp plates are applied to the edge portions thereof as seen in Fig. 9, where the horizontal panel C is joined to the two upright panels A, A¹. Similarly two clamps are applied to the opposite side edges thereof. When two clamps are placed with their grooves forming a cross, the vertical grooves of both clamps align, and align the upright panels, and the horizontal grooves align with the horizontal panel.

More or less variation of the exact details of construction is possible without departing from the spirit of this invention; I desire, therefore, not to limit myself to the exact form of the construction shown and described, but intend, in the following claims to point out all of the invention disclosed herein.

I claim and new and desire to secure by Letters Patent:

1. A clamp for clamping together angularly disposed panels, comprising a clamp plate having a side member formed with two flat flanges which extend rearwardly therefrom at right angles to each other, a clamp block having two flat sides extending at right angles to each other and paralleling said flanges, said two sides of the clamp block and said two flanges of the clamp plate forming two panel receiving grooves that extend at right angles to each other, a diagonally extending obliquely disposed flange on the clamp plate on which the clamp block rides and is moved toward the two flanges of the clamp plate, and a screw connection between said clamp plate and clamp block adapted to move said clamp block towards the flanges of the clamp plate, whereby to clamp angularly disposed panels between said flanges and the clamp block.

2. A clamp for connecting together angularly disposed panels, comprising a clamp plate having a side member formed with two rearwardly projecting flanges extending at an angle to each other, said side member having also a diagonal and rearwardly extending flange which inclines in an oblique direction from the side member, a clamp block having two right angled sides paralleling the right angled flanges of the clamp plate, and a diagonally extending side, paralleling the diagonal flange of the clamp plate, said clamp block being arranged to ride upon said inclined diagonal flange of the clamp plate, and a screw having a head engaging one of said members and threadedly engaging the other, said screw when screwed home acting to draw said clamp block along said inclined diagonal flange of the clamp plate, thereby forcing the clamp block toward right angled flanges of the clamp plate, whereby to clamp two angularly disposed panels between said last mentioned flanges and the clamp block.

3. A clamp for connecting together angularly disposed panels, comprising a clamp plate having two rearwardly projecting panel engaging flanges extending at right angles to each other, said clamp plate having also a diagonally and rearwardly extending flange which is inclined in an oblique direction laterally and rearwardly of the plate, a clamp block having two right angled sides paralleling the right angled flanges of the clamp plate and a diagonally extending side paralleling the diagonal flange of the clamp plate with an edge thereof riding on said diagonal flange, and a screw having a head engaging the clamp plate and threadedly engaged in the clamp block, said screw when screwed home acting to draw an edge of the diagonal side of the clamp block along the inclined face of the diagonal flange of the clamp plate, whereby to force the right angled sides of the clamp block toward the right angled flanges of the clamp plate to thereby clamp angularly disposed panels between said flanges and clamp block.

4. A clamp comprising a resilient sheet metal clamp plate having a side member formed with two slightly inclined flanges that are bent back from the side member and extend at right angles to each other, said clamp plate being also formed with a third flange bent back from an edge of the side member, which flange extends at an angle of approximately forty-five degrees to the other flanges, and inclines rearwardly from the side member to provide an inclined plane, said first mentioned flanges being adapted to extend over side faces of two panels that are disposed at right angles to each other with the rear face of the side member contacting the edges of said panels, in combination with a clamp block of right angle triangular form disposed on the rear side of the side member with its right angled sides disposed parallel with the first mentioned flanges and spaced therefrom to form two grooves for the reception of edge portions of the two panels, and its oblique side being adapted to ride upon the oblique inclined flange of the side member, and a screw having a head engaging the clamp plate and threadedly engaged with the clamp block, said screw when tightened up serving to move the clamp block along the oblique inclined flange of the clamp plate, whereby the clamp block is forced against the sides of the panels opposite to those engaged by the first mentioned flanges.

CLIFFORD J. KAMIN.